United States Patent [19]
McSherry et al.

[11] Patent Number: 4,562,982
[45] Date of Patent: Jan. 7, 1986

[54] STACKABLE CABLE SPACER

[75] Inventors: William E. McSherry, Country Club Hills; Robert L. Sokol, Orland Park, both of Ill.

[73] Assignee: Panduit Corp., Tinley Park, Ill.

[21] Appl. No.: 580,415

[22] Filed: Feb. 15, 1984

[51] Int. Cl.[4] .............................................. F16L 3/00
[52] U.S. Cl. ..................................... 248/61; 248/68.1
[58] Field of Search ................................... 248/61–63, 248/49, 68 CB, 74.1, 558, 188.2, 58, 68.1

[56] References Cited

U.S. PATENT DOCUMENTS

| | | | |
|---|---|---|---|
| 396,321 | 1/1889 | Baird . | |
| 2,595,857 | 5/1952 | Kinsel | 248/61 |
| 2,893,164 | 7/1959 | Martin | 248/188.2 |
| 3,250,505 | 5/1966 | Rodman, Sr. et al. | 248/49 |
| 3,486,725 | 12/1969 | Hidassy | 248/68 |
| 3,559,933 | 2/1971 | Castellani | 248/74.1 |
| 4,191,334 | 3/1980 | Bulanda et al. | 24/16 |
| 4,306,697 | 1/1981 | Mathews | 248/68 |
| 4,395,009 | 7/1983 | Bormke | 248/74 |
| 4,397,435 | 8/1983 | Fisher | 248/61 |
| 4,408,741 | 10/1983 | Mimura et al. | 248/68 |

OTHER PUBLICATIONS

Panduit Wiring Products Catalog E-100, Copyright 1980, p. 28; Panduit Corp., 17301 Ridgeland Ave., Tinley Park, IL 60477.

Primary Examiner—Reinaldo P. Machado
Assistant Examiner—Alvin Chin-Shue
Attorney, Agent, or Firm—Charles R. Wentzel; Mark D. Hilliard

[57] ABSTRACT

A stackable cable spacer for spacing adjacent cables a predetermined variable distance apart is secured between the cables by a cable tie reeved around the cables. The spacer includes a body member having a cable tie receiving means for accepting and locating the cable tie; a first mating portion secured to the body member; and a second mating portion secured to the body member, the second mating portion being adapted to matingly receive the first mating portion of a second spacer allowing said spacer to be used individually or with other spacers in a mating contiguous relationship to provide selectable spacing of adjacent cables.

24 Claims, 8 Drawing Figures

STACKABLE CABLE SPACER

TECHNICAL FIELD

The present invention relates generally to an assembly for securing a first elongate object a predetermined distance from a second elongate object and more specifically, to a spacer that can be disposed individually or stacked consecutively between the first and second elongate objects and secured by a discrete cable tie to provide variable spacing of the first elongate object relative to the second elongate object.

BACKGROUND ART

In many different industrial applications, it is desirable to secure one elongate object to another parallel elongate object in a spaced relationship. For example, it is common practice in the communication industry to suspend signal transmission cables, such as telephone cables and television cables, from wire support cables that are in turn secured between upright pole supports by metal brackets. The transmission cable is typically secured to the weight supporting cable by a helical lashing wire wrapped around and along the length of both cables. The lashing wire terminates and is fixed to the support cable a short distance from both sides of the support pole. The non-lashed section of transmission cable proximate the support pole is free to move relative to the support cable and the support cable's mounting bracket. Free movement of the cable relative to the support pole and the mounting bracket can result in abrasion damage to the transmission cable as the freely moving section of transmission cable flexes against the support cable mounting bracket.

To prevent such abrasion damage, a cable spacer has typically been secured between the support cable and the transmission cable on either side of the support pole to limit the movement of the transmission cable relative to the support cable and thus prevent the transmission cable from coming into contact with the support cable bracket.

Cable spacers are also used to position a transmission cable relative to a support cable in the proximity of various types of in-line junction boxes, such as splice cases, repeaters and amplifiers in order to neatly position the components and prevent strain on the connecting hardware. In all these uses, the optimal amount of separation of the support and transmission cable will vary depending upon the size of the cables and the manner in which they are used. Reference may be had to the following United States patents which each propose a different cable spacer: U.S. Pat. No. 2,595,857 and U.S. Pat. No. 4,191,334.

U.S. Pat. No. 2,595,857 discloses a spacer that is secured by a clamping band to adjacent cables. Such a spacer does not provide for variable spacing of adjacent cables; different spacing requirements necessitating the stocking of a number of different spacer sizes. Additionally, such a spacer tends to be unstable in larger sizes, which can result in undesirable spacer movement.

U.S. Pat. No. 4,191,334, which patent is owned by our common assignee, Panduit Corp., discloses a one piece cable tie for positioning a first and a second wire relative to one another. The one piece cable ties does not allow variable spacing of adjacent cables.

None of the above patents disclose a cable spacer which will allow variable adjustment of the amount of separation of adjacent cables while securely and stably positioning the adjacent cables. The prior cable spacers require the manufacture and stocking of a number of different cable spacer sizes in order to provide for different spacing requirements, with the resultant increased expense, inconvenience and inflexibility.

DISCLOSURE OF THE INVENTION

Among the several objects of the present invention may be noted, the provision of an improved cable spacer that is usable separately or joined with other such spacers to effect incrementally variable spacing of adjacent elongate cables or wires; the provision of such a cable spacer that facilitates secure and stable fastening of adjacent cables with a locking strap; the provision of such a cable spacer that can be utilized to secure and space cables of varying diameters; and the provision of a spacer that is simple and economical to manufacture.

In general, a stackable cable spacer for separating at least two cables or the like includes a body portion having a passageway for accepting a securing cable tie that is reeved around the adjacent cables. Integrally formed on the body portion are a first mating portion and a second mating portion, the second mating portion being adapted to matingly receive the first mating portion of a second spacer. A cradle means can be located on the opposing surfaces of the spacer contiguous to each respective cable, the cradle means engaging and locating each of the respective cables.

PREFERRED EMBODIMENT FOR CARRYING OUT THE INVENTION

Figure 1:
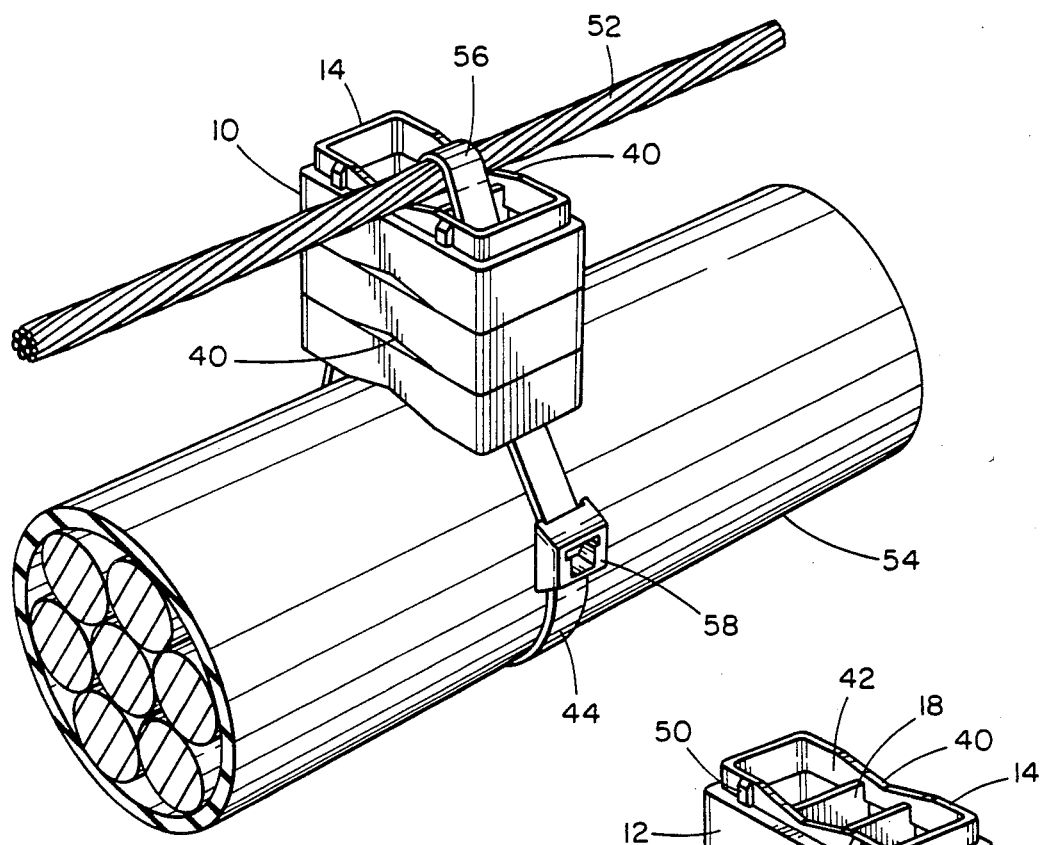
FIG. 1 is a perspective view of an assembly including a cable tie and a plurality of stacked spacers each of which embodies the concept of the present invention, the spacers being interposed between a support cable and a transmission cable and secured to the cables by the cable tie.
Figure 2:
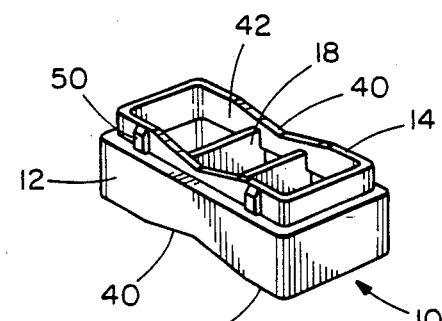
FIG. 2 is a perspective view of a single spacer embodying the concept of the present invention.
Figure 3:
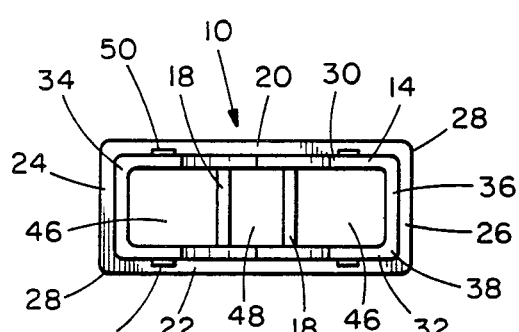
FIG. 3 is a top view of the spacer of FIG. 2.
Figure 5:
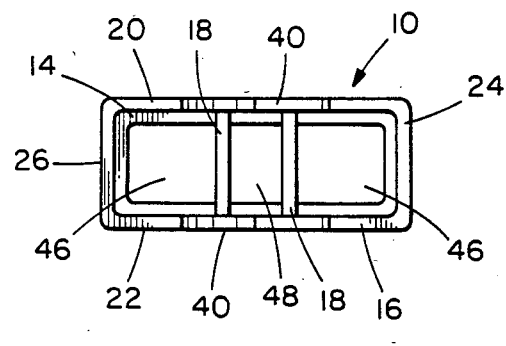
FIG. 5 is a bottom view of the spacer of FIG. 2.
Figure 4:
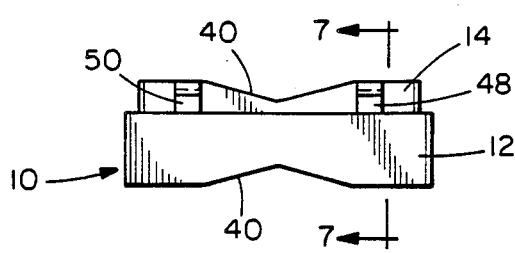
FIG. 4 is a side view of the spacer of FIG. 2.
Figure 6:
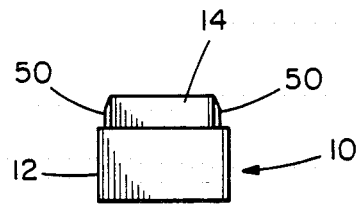
FIG. 6 is an end view of the spacer of FIG. 2.
Figure 7:
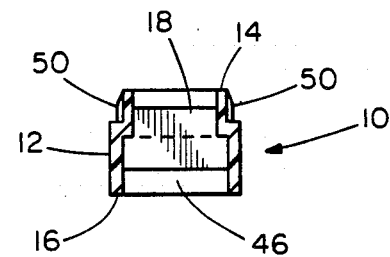
FIG. 7 is a sectional view taken along line 7—7 of FIG. 4 of the spacer of FIG. 2.

A stackable spacer means embodying the concept of the present invention is designated by the numeral 10 in the accompanying drawings. Referring now to FIGS. 2 through 7, spacer 10 includes a rectangular tubular body member 12, a male annular lip 14, a female annular lip 16 and two interiorally located reinforcing ribs 18.

Figure 8:
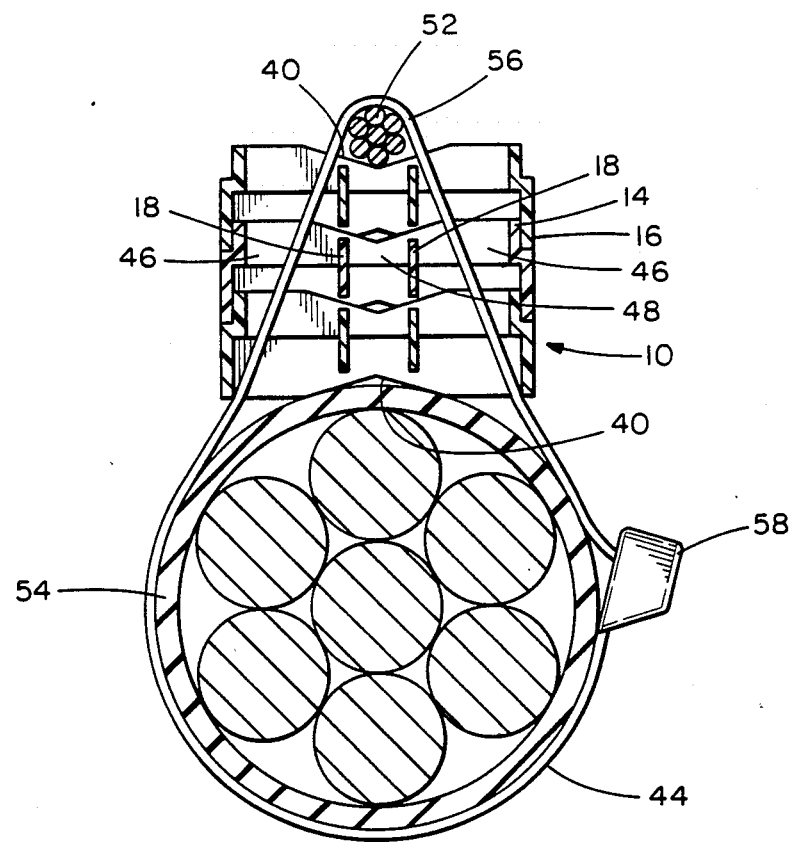
FIG. 8 is a sectional view of the assembly of FIG. 1.

Spacer 10 is preferably of integrally molded thermoplastic construction with male and female annular lips 14 and 16 being adapted to mate and non-rotatably interlock with respective opposing female and male annular lips of other adjacently stacked spacers, as seen in FIGS. 1 and 8.

Body member 12 includes a first longitudinal body portion 20 disposed parallel to a second longitudinal body portion 22 and a first lateral body portion 24 disposed parallel to a second lateral body portion 26; all four of said body portions being continuously joined at respective corner edges 28 to form body member 12.

Rectangular male annular lip 14 projects and is recessed inwardly from the upper edges of body portions 20, 22, 24 and 26. Male lip 14 includes a first longitudinal lip portion 30, a second longitudinal lip portion 32, a first lateral lip portion 34, and a second lateral lip portion 36; all four lip portions being disposed parallel to corresponding body portions 20, 22, 24 and 26. Lip portions 30, 32, 34 and 36 are continuously joined at corner edges 38.

In preferred form, female annular lip 16 is defined by the lower interior edge of body portions 20, 22, 24 and 26.

Disposed on opposing male and female annular lips 14 and 16 are a pair of V-shaped notches 40. Notches 40 are medially disposed along the length of spacer 10 and are aligned to accept and cradle a contiguous elongate object transversely disposed relative to spacer 10.

Ribs 18 are integrally molded in interior passageway 42 of body member 12 connecting the opposing interior surfaces of spacer 10. Passageway 42 acts as a cable tie receiving means for accepting and locating a securing and locking strap means 44. Ribs 18 are medically located, being symmetrically spaced apart from the lateral center line of spacer 10. Passageway 42 is divided into two outer opposing lateral passageways 46 and a center passageway 48 by spaced apart ribs 18. In preferred form, outer opposing lateral passageways 46 each accept and locate opposing portions of strap means 44. Ribs 18 strengthen the tubular spacer 10.

Located on the outer circumferential surface of male annular lip 14 are four protuberances 50 that effect an interference fit between mated male and female annular lips 14 and 16 which tends to prevent inadvertent removal of male annular lip 14 from female annular lip 16 of contiguously stacked spacers 10 and facilitates manipulation of a plurality of spacers 10 as an interconnected unit.

Referring now to FIGS. 1 and 8, a spacer assembly is depicted including a plurality of individual spacers 10 stacked in a mating contiguous relationship and secured between a wire support cable 52 and a signal transmission cable 54 by a locking strap means 44 reeved around cable 52 and cable 64. In preferred form, securing and locking strap means 44 is an integrally molded plastic cable tie having a strap portion 56 and a locking head portion 58, it being understood that a great variety of elongated lockable ties made of a variety of materials are compatible with the teachings of the present invention.

Strap 56 of cable tie 44 is received and located in the respective lateral passageways 46 of each spacer 10 to secure each individual spacer 10 between cables 52 and 54; is being understood that ribs 18 are not essential features of spacer 10 and cable tie 44 can be received and located in the single passageway 42 in the absence of lateral passageways 46.

The interlocking male and female annular lips 14 and 16 of spacers 10 and the cable tie securing means 44 located within interior passageway 42 of each spacer 10 prevent individual movement of one spacer 10 relative to another spacer 10 thus individually securing each spacer 10 to contiguous spacers 10 and integrally securing the spacer assembly to cables 52 and 54. Additionally, the spacer assembly is self-aligning with cables 52 and 54 due to the self-aligning action of each cable cradled within its respective V-shaped notch 40.

Spacer 10 can be secured between cables 52 and 54 individually or with other contiguously stacked spacers 10 to space cables 52 and 54 a predetermined variable distance apart. Additionally, the adjustable nature of cable tie 44 allows the spacer assembly to accommodate cables of varying diameters.

In use, a predetermined number of spacers 10 can be interlocked and handled as an integral unit thus facilitating the manipulation of the interconnected stacked spacers during the application of the spacer assembly.

I claim:

1. A stackable spacer for spacing adjacent cables, or the like, a predetermined variable distance apart, said spacer being contiguously secured between the cables by a cable tie, or the like, reeved around the cables, said cable tie being adjustable to accommodate varying diameter cables, comprising:

a body member having passageway means within said body, for receiving the spacer securing cable tie;

a first mating portion secured to said body member; and a second mating portion secured to said body member, said second mating portion being adapted to matingly receive said first mating portion of a second spacer allowing said spacer to be used individually or with other spacers in a mating contiguous relationship to provide selectable spacing of the adjacent cables.

2. A spacer as set forth in claim 1, wherein said body member presents cradle means disposed on opposing surfaces of said body member, said cradle means engaging and locating respective contiguous cables.

3. A spacer as set forth in claim 2, wherein said body member has a tubular shape; said first mating portion including a male annular lip integrally formed with said body member and coaxially disposed relative to said passageway; and said second mating portion including a female annular lip integrally formed with said body member and coaxially disposed relative to said passageway, said female annular lip being adapted to matingly receive the male annular lip of another contiguously stacked spacer.

4. A spacer as set forth in claim 3, wherein said male annular lip and said female annular lip are disposed on opposing surfaces of said spacer means and are substantially congruent.

5. A spacer as set forth in claim 4, wherein said male annular lip includes a recessed first annular edge of said body member and wherein said female annular lip includes a second annular edge of said body member defined by the continuous interior edge of said tubular body member.

6. A spacer as set forth in claim 5, wherein said cradle means includes said male and female annular lips each having medially disposed V-shaped depressions, said depressions being disposed to align with each respective contiguous cable and wherein said male annular lip and said female annular lip non-rotatably interlock.

7. A spacer as set forth in claim 3, further including means for effecting an interference fit between mating male and female annular lips of stacked spacers, whereby said stacked spacers are joined as an interconnected unit to facilitate manipulation of said stacked spacers.

8. A stackable spacer for spacing adjacent cables, or the like, a predetermined variable distance apart, said spacer being contiguously secured between the cables by a cable tie, or the like, reeved around the cables, said cable tie being adjustable to accomodate varying diameter cables, comprising:

a body member having cable tie receiving means for accepting and locating the cable tie;

a first mating portion secured to said body member;

a second mating portion secured to said body member, said second mating portion being adapted to matingly receive said first mating portion of a second spacer allowing said spacer to be used individually or with other spacers in a mating contiguous relationship to provide selectable spacing of the adjacent cables; and cradle means disposed on opposing surfaces of said body member, said cradle means engaging and locating respective contiguous cables; said body member having a tubular shape with said cable tie receiving means including a passageway medially located in said body member; said first mating portion including a male annular lip integrally formed with said body member and coaxially disposed relative to said passageway; said second mating portion including a female annular lip integrally formed with said body member and coaxially disposed relative to said passageway, said female annular lip being adapted to matingly receive the male annular lip of another contiguously stacked spacer, said male annular lip and said female annular lip being disposed on opposing surfaces of said spacer means and being substantially congruent; said male annular lip including a recessed first annular edge of said body member and said female annular lip including a second annular edge of said body member defined by a continuous interior edge of said tubular body member; said cradle means including said male and female annular lips each having medially disposed V-shaped depressions, said depressions being disposed to align with each respective contiguous cable; and said male annular lip and said female annular lip non-rotatably interlocking; and said spacer further including rib means medially disposed in said passageway to connect opposing interior surfaces of said body member and define a plurality of individual passageways for accepting and locating said cable tie.

9. A spacer assembly for securing and spacing adjacent cables, or the like, said assembly effecting variable spacing of the adjacent cables, and said assembly being adjustable to accommodate varying diameter cables, said assembly comprising:

locking strap means reeved around each of the cables for securing said assembly to the adjacent cables;

stackable spacer means contiguously interposed between adjacent cables, said spacer means having passageway means within said spacer means for receiving said strap means and said spacer means being adapted to be utilized individually or to be utilized with other spacer means in a mating contiguous relationship to provide variable spacing of at least two cables, said strap means being positioned within said passageway means to secure each of said spacer means between the cables.

10. An assembly as set forth in claim 9, wherein a plurality of said spacer means are consecutively and matingly stacked.

11. An assembly as set forth in claim 10, wherein said spacer means presents cradle means disposed on the opposing surfaces of said spacer means contiguous to and aligned with each respective cable, said cradle means respectively engaging and locating each of the cables.

12. An assembly as set forth in claim 11, wherein said spacer means includes a first mating portion and a second mating portion, said second mating portion being adapted to matingly receive said first mating portion of another spacer means.

13. An assembly as set forth in claim 12, wherein said spacer means includes a tubular body member; said passageway means includes a passageway disposed in said body member; said first mating portion includes a male annular lip integrally formed with said body member and coaxially disposed relative to said passageway; and said second mating portion includes a female annular lip integrally formed with said body member and coaxially disposed relative to said passageway, said female annular lip being adapted to matingly receive said male annular lip of another contiguously stacked spacer.

14. An assembly as set forth in claim 13, further including means for effecting an interference fit between mating male and female annular lips of stacked spacers, whereby said stacked spacers are joined as an interconnected unit to facilitate manipulation of said stacked spacers and wherein said male annular lip and said female annular lip are substantially congruent and non-rotatably interlock.

15. A spacer assembly for securing and spacing adjacent cables, or the like, said assembly effecting variable spacing of the adjacent cables, and said assembly being adjustable to accommodate varying diameter cables, said assembly comprising:

locking strap means reeved around each of the cables for securing said assembly to the adjacent cables;

stackable spacer means contiguously interposed between adjacent cables, said spacer means being adapted to be utilized individually or to be utilized with other spacer means in a mating contiguous relationship to provide variable spacing at a least two cables, said strap means securing each of said spacer means between the cables;

wherein said spacer means includes a tubular body member having an internally disposed passageway for containing and positioning said strap means; a male annular lip integrally formed with said body member and coaxially disposed relative to said passageway; and a female annular lip integrally formed with said body member and coaxially disposed relative to said passageway, said female annular lip being adapted to matingly receive said male annular lip of another contiguously stacked spacer;

wherein said body member includes a first longitudinal body protion disposed parallel to a second longitudinal body portion, and a first lateral body portion disposed parallel to a second lateral body portion, all four of said body portions being respectively and contiguously joined at four corner edges;

wherein said male annular lip includes a first annular edge of said body member and wherein said female annular lip includes a second annular edge of said body member defined by the continuous interior edge of said joined first and second longitudinal body portions and said first and second lateral body portions; and further including rib means medially disposed in said passageway to connect opposing inner faces of at least two of said body portions and to define a plurality of individual passageways for containing and positioning said strap means and wherein said cradle means includes said male and female annular lips each having medially disposed and aligned V-shaped depressions, said depressions being disposed to align with each respective contiguous cable.

16. A cable assembly comprising:
a first cable;
a second cable;
spacer means disposed between said first and second cable for spacing said first cable a predetermined variable distance from said second cable;
cable tie securing means reeved around said first and second cables for securing securing said cables and said spacer means relative to one another;
said spacer means comprising a stackable spacer having mating portions whereby a plurality of spacers can be matingly engaged to provide the predetermined distance, said spacer including passageway means within said spacer means for receiving said cable tie securing means, said cable tie securing means being positioned within said passageway to secure said spacer between said cables.

17. A cable assembly as set forth in claim 16, wherein said spacer includes:
a first mating portion secured to said body member;
a second mating portion secured to said body member, said second mating portion being adapted to matingly receive said first mating portion of a second spacer allowing said spacer to be used individually or with other spacers in a mating contiguous relationship to provide selectable spacing of the adjacent cables; and
a cradle means disposed on opposing surfaces of said body member, said cradle means engaging and locating respective contiguous cables.

18. A cable assembly as set forth in claim 17, wherein said body member has a tubular shape and said passageway means is medially located in said body member; said first mating portion including a male annular lip integrally formed with said body member and coaxially disposed relative to said passageway; and said second mating portion including a female annular lip integrally formed with said body member and coaxially disposed relative to said passageway, said female annular lip being adapted to matingly receive a male annular lip of another contiguously stacked spacer.

19. A cable assembly as set forth in claim 18, wherein said male annular lip includes a recessed first annular edge of said body member and wherein said female annular lip includes a second annular edge of said body member defined by the continuous interior edge of said tubular body member, and further including means for effecting an interference fit between mating male and female annular lips of stacked spacers, whereby said stacked spacers are joined as an interconnected unit to facilitate manipulation of said stacked spacers.

20. A stackable spacer for spacing adjacent cables, or the like, a predetermined variable distance apart, said spacer being contiguously secured between the cables by a cable tie, or the like, reeved around the cables, said cable tie being adjustable to accommodate varying diameter cables, comprising:
a body member having cable tie receiving means for accepting and locating the cable tie;
a first mating portion secured to said body member;
a second mating portion secured to said body member, said second mating portion being adapted to matingly receive said first mating portion of a second spacer allowing said spacer to be used individually or with other spacers in a mating contiguous relationship to provide selectable spacing of the adjacent cables; and
cradle means disposed on opposing surfaces of said body member, said cradle means engaging and locating respective contiguous cables, said body member having a tubular shape with said cable tie receiving means including a passageway medially located within said body member; said first mating portion including a male annular lip integrally formed with said body member and coaxially disposed relative to said passageway; and said second mating portion including a female annular lip integrally formed with said body member and coaxially disposed relative to said passageway, said female annular lip being adapted to matingly receive the male annular lip of another contiguously stacked spacer.

21. A stackable spacer for spacing adjacent cables, or the like, a predetermined variable distance apart, said spacer being contiguously secured between the cables by a cable tie, or the like, reeved around the cables, said cable tie being adjustable to accommodate varying diameter cables, comprising:
a first substantially planar longitudinal body portion;
a second substantially planar longitudinal body portion spaced from said first longitudinal body portion and disposed parallel thereto, each of said first and second planar body portions having opposing first and second longitudinal edges;
rib means for connecting said first and second body portions at interior opposing surfaces, said rib means being integrally formed with said first and second longitudinal body portions and extending substantially perpendicular to said parallel planar body portions, whereby opposing lateral passageways are defined by said rib means and portions of said first and second body portions extending beyond said rib means, said body portions extending outwardly from said rib means an amount sufficient to receive the spacer securing cable tie to prevent transverse movement of said spacer relative to the cable tie positioned in said lateral passageway;
first and second mating portions disposed on said first and second longitudinal edges, said second mating portion being adapted to matingly receive said first mating portion of a second spacer stacked there against to prevent relative movement between said adjacent spacers in a plane substantially perpendicular to the length of the cable tie positioned within said lateral passageways; and
cradle means disposed on said first and second longitudinal edges for engaging and locating respective cables.

22. A stackable spacer as set forth in claim 21, wherein said rib means includes a pair of spaced apart ribs.

23. A cable assembly comprising:
a first cable;
a second cable;
spacer means disposed between said first and second cables for spacing said first cable a predetermined variable distance from said second cable; and
cable tie securing means reeved around said first and second cables for securing said cables and spacer means relative to one another, said spacer means including a first substantially planar longitudinal body portion; a second substantially planar longitudinal body portion spaced from said first longitudinal body portion and disposed parallel thereto, each of said first and second planar body portions having opposing first and second longitudinal edges; rib means for connecting said first and second body portions at interior opposing surfaces, said rib means being integrally formed with said first and second longitudinal body portions and extending substantially perpendicular to said parallel planar body portions, whereby opposing lateral passageways are defined by said rib means and portions of said first and second body portions extending beyond said rib means, said body portions extending outwardly from said rib means an amount sufficient to receive said cable tie securing means to prevent transverse movement of said spacer relative to said cable tie securing means positioned in said lateral passageway; first and second mating portions disposed on said first and second longitudinal edges, said second mating portion being adapted to matingly receive said first mating portion of a second spacer stacked there against to prevent relative movement between said adjacent spacers in a plane substantially perpendicular to the length of the cable tie securing means positioned within said lateral passageways; and cradle means disposed on said first and second longitudinal edges for engaging and locating respective cables.

24. A cable assembly as set forth in claim 23, wherein said rib means includes a pair of spaced apart ribs.

* * * * *

UNITED STATES PATENT AND TRADEMARK OFFICE
CERTIFICATE OF CORRECTION

PATENT NO. : 4,562,982
DATED : January 7, 1986
INVENTOR(S) : William E. McSherry and Robert L. Sokol It is certified that error appears in the above-identified patent and that said Letters Patent are hereby corrected as shown below:

Column 3, line 22, change "medically" to --medially--.

Column 3, line 43, change "cable 64" to --cable 54--.

Column 3, line 53, change "is" to --it--.

Column 6, claim 15, line 52, change "protion" to --portion--.

Column 7, claim 16, line 14, delete the second "securing".

Signed and Sealed this

Twenty-fourth Day of June 1986

[SEAL]

Attest:

DONALD J. QUIGG

Attesting Officer

Commissioner of Patents and Trademarks